(12) United States Patent
Steiner

(10) Patent No.: US 9,689,961 B2
(45) Date of Patent: Jun. 27, 2017

(54) APPARATUS, SYSTEM AND METHOD OF COMMUNICATION BETWEEN WIRELESS NETWORKS HAVING DIFFERENT COORDINATE DOMAINS

(71) Applicant: INTEL IP CORPORATION, Santa Clara, CA (US)

(72) Inventor: Itai Steiner, Tel Aviv (IL)

(73) Assignee: INTEL IP CORPORATION, Santa Clara, CA (US)

( * ) Notice: Subject to any disclaimer, the term of this patent is extended or adjusted under 35 U.S.C. 154(b) by 12 days.

(21) Appl. No.: 14/669,429

(22) Filed: Mar. 26, 2015

(65) Prior Publication Data
US 2016/0282443 A1    Sep. 29, 2016

(51) Int. Cl.
H04W 4/02    (2009.01)
G01S 5/00    (2006.01)
G01S 5/02    (2010.01)

(52) U.S. Cl.
CPC .......... *G01S 5/0072* (2013.01); *G01S 5/0205* (2013.01); *G01S 5/0289* (2013.01); *H04W 4/02* (2013.01)

(58) Field of Classification Search
CPC ......... H04W 64/00; H04W 4/02; H04W 4/04; H04W 24/00
USPC .............. 455/456.1–456.3, 457; 342/357.28, 342/357.55
See application file for complete search history.

(56) References Cited

U.S. PATENT DOCUMENTS

| 2011/0039578 A1* | 2/2011 | Rowitch ................... G01S 5/10 455/456.1 |
| 2014/0235244 A1 | 8/2014 | Hinman |
| 2014/0378180 A1 | 12/2014 | Schwent et al. |

FOREIGN PATENT DOCUMENTS

| WO | 2007079108 | 7/2007 |
| WO | 2012096505 | 7/2012 |
| WO | 2013069941 | 5/2013 |

OTHER PUBLICATIONS

IEEE Std 802.11™-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Sam Bhattacharya
(74) *Attorney, Agent, or Firm* — Shichrur & Co.

(57) ABSTRACT

Some demonstrative embodiments include apparatuses, systems and/or methods of communication between wireless networks having different coordinate domains. For example, a first wireless communication device may include a radio to communicate over a first wireless network having a first coordinate domain, the radio to receive a message from a second wireless device of a second wireless network having a second coordinate domain, the message including coordinate information of the second coordinate domain; and a controller to determine, based on the coordinate information, a usage of the second coordinate domain by the first wireless communication device, and to publish the usage to the second wireless communication device.

25 Claims, 4 Drawing Sheets

(56) References Cited

OTHER PUBLICATIONS

IEEE Std 802.11v™-2011, IEEE Standard for Information Technology—Telecommunications and information exchange between systems Local and metropolitan area networks—Specific requirements, Part 11: Wireless LAN Medium Access Control (MAC) and Physical Layer (PHY) specifications, Amendment 8: IEEE 802.11 Wireless Network Management, Feb. 9, 2011, 433 pages.

IEEE Std 802.11u™-2011, IEEE Standard forInformation technology—Telecommunications and information exchangebetween systems—Local and metropolitan area networks—Specific requirements Part 11: Wireless LAN Medium AccessControl (MAC)and Physical Layer (PHY) Specifications Amendment 9: Interworking with External Networks, Feb. 25, 2011, 208 pages.

IEEE Std 802.11k™-2008, IEEE Standard for Information technology—Telecommunications and information exchange between systems—Local and metropolitan area networks—Specific requirements Part 11: Wireless LAN Medium Access Control (MAC) and Physical Layer (PHY) Specifications Amendment 1: Radio Resource Measurement of Wireless LANs, Jun. 12, 2008, 243 pages.

International Search Report and Written Opinion for PCT/US2016/019489, mailed on May 30, 2016, 11 pages.

\* cited by examiner

APPARATUS, SYSTEM AND METHOD OF COMMUNICATION BETWEEN WIRELESS NETWORKS HAVING DIFFERENT COORDINATE DOMAINS

TECHNICAL FIELD

Embodiments described herein generally relate to communication between wireless networks having different coordinate domains.

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem. This problem does not yet have a scalable solution with satisfactory precision.

An estimated location of a station may be determined by calculating two or more distances between the station and two or more other stations, e.g., Access Points (APs).

The distances between the station and the two or more other stations may be determined using a Time-of-Flight (ToF) measurement procedure (also referred to as "Fine Timing Measurement (FTM)"). A ToF value may be defined as the overall time a signal propagates from a first station to a second station and back to the first station. A distance between the first and second stations may be calculated based on the ToF value, for example, by dividing the ToF value by two and multiplying the result by the speed of light.

The estimated location of the station may be based on the distances between the station and the two or more other stations and the locations of the two or more other stations, for example, using a trilateration method.

The locations of the two or more other stations may be represented based on local coordinate grids, e.g., a coordinate grid corresponding to a specific location.

Large areas, e.g., buildings, malls and the like, may include a plurality of stations, which belong to a plurality of different communication networks. Each communication network may have a different local coordinate grid.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
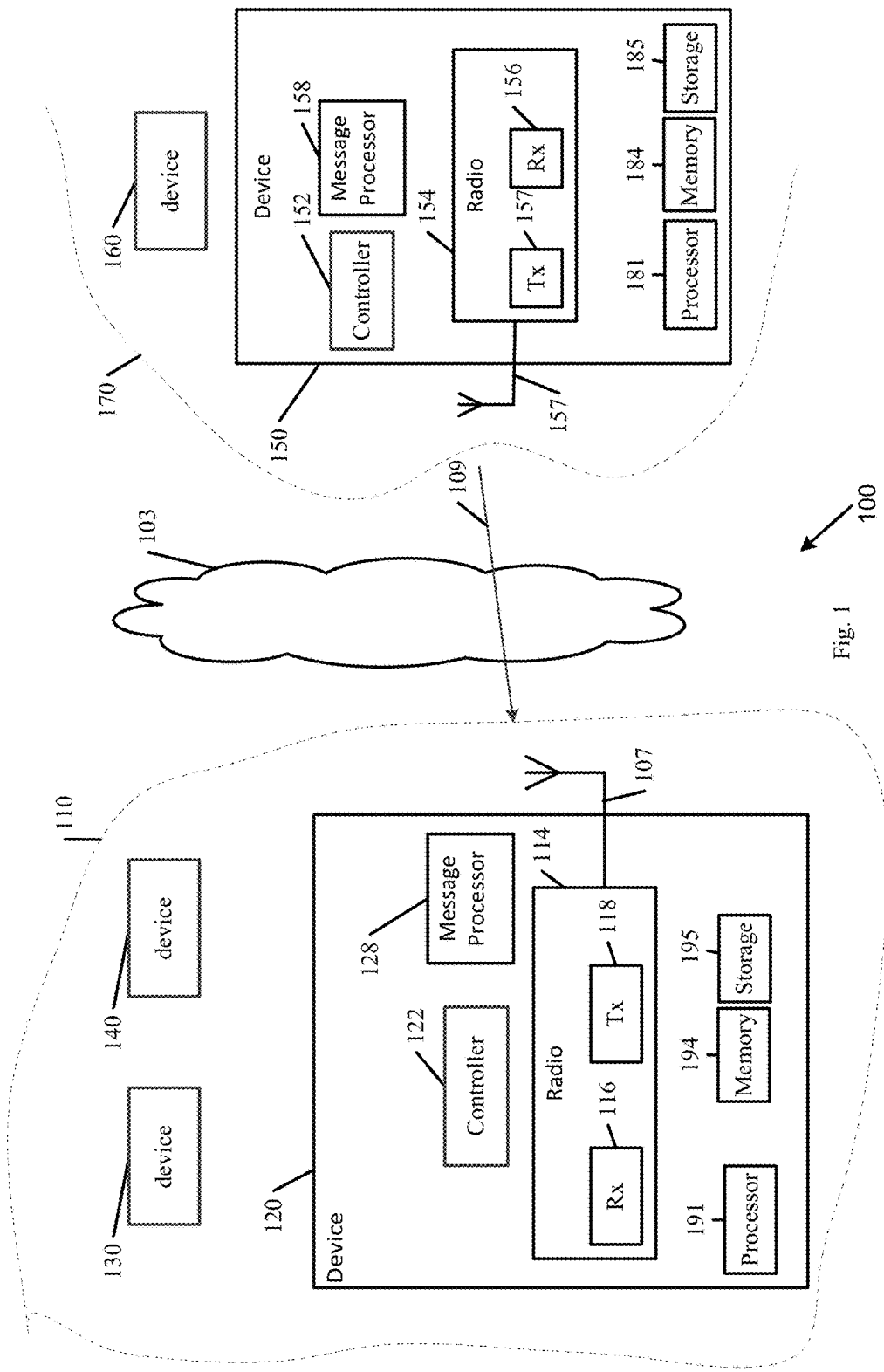
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification")*) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

Reference is now made to FIG. 1, which schematically illustrates a block diagram of a system 100, in accordance with some demonstrative embodiments.

As shown in FIG. 1, in some demonstrative embodiments system 100 may include a plurality of wireless communication devices configured to communicate with one or more wireless communication devices. For example, system 100 may include a wireless communication device 120, a wireless communication device 130, a wireless communication device 140, a wireless communication device 150, and/or a wireless communication device 160 configured to communicate with one or more wireless communication devices of system 100.

In some demonstrative embodiments, one or more wireless communication devices of system 100 may include a station (STA). For example, at least one of wireless communication device 120, 130, 140, 150 and/or 160 may perform the functionality of a STA.

In some demonstrative embodiments, one or more wireless communication devices of system 100 may include an Access Point. For example, at least one of wireless communication devices 120, 130, 140, 150 and/or 160 may perform the functionality of an AP.

In some demonstrative embodiments, wireless communication devices 120, 130, 140, 150, and/or 160 may include, for example, a router, a hot spot, an AP, a ToF responder, a desktop computer, a server computer, a non-mobile or a non-portable device.

In other embodiments, wireless communication devices 120, 130, 140, 150, and/or 160 may perform the functionality of any other wireless communication devices.

In some demonstrative embodiments, device 120 may include, for example, one or more of a processor 191, a memory unit 194 and/or a Storage unit 195; and/or device 150 may include, for example, one or more of a processor 181, a memory unit 184 and/or a Storage unit 185. Devices 120 and/or 150 may optionally include other suitable hardware components and/or software components. In some demonstrative embodiments, some or all of the components of one or more of devices 120 and/or 150 may be enclosed in a common housing or packaging, and may be interconnected or operably associated using one or more wired or wireless links. In other embodiments, components of one or more of devices 120 and/or 150 may be distributed among multiple or separate devices.

Processors 191 and/or 181 include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 191 executes instructions, for example, of an Operating System (OS) of device 120 and/or of one or more suitable applications; and/or processor 181 executes instructions, for example, of an Operating System (OS) of device 150 and/or of one or more suitable applications.

Memory unit 194 and/or 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 120; and/or memory unit 184 and/or storage unit 185, for example, may store data processed by device 150.

In some demonstrative embodiments, wireless communication devices 120, 130 140, 150 and/or 160 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a Wireless Fidelity (WiFi) channel, an IR channel, a Bluetooth (BT) channel, and the like.

In some demonstrative embodiments, wireless communication medium 103 may include a wireless communication channel over a 2.4 Gigahertz (GHz) frequency band, a 5 GHz frequency band, a millimeterWave (mmWave) frequency band, e.g., a 60 GHz frequency band, a sub 1 Gigahertz (S1G) frequency band, and/or any other frequency band.

In some demonstrative embodiments, wireless communication devices 120 130, 140, 150, and/or 160 may include one or more radios including circuitry and/or logic to perform wireless communication between device 120, 130, 140, 150, and/or 160 and/or with one or more other wireless communication devices. For example, device 120 may include a radio 114, and/or device 150 may include a radio 154.

In some demonstrative embodiments, radios 114 and/or 154 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 154 may include a receiver 156.

In some demonstrative embodiments, radios 114 and/or 154 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 154 may include a transmitter 157.

In some demonstrative embodiments, radios 114 and/or 154 may include circuitry and/or logic, modulation elements, demodulation elements, amplifiers, analog to digital and digital to analog converters, filters, and/or the like. In one example, radios 114 and/or 154 may include or may be implemented as part of a wireless Network Interface Card (NIC), and the like.

In some demonstrative embodiments, radios 114 and/or 154 may include, or may be associated with, one or more antennas 107 and/or 157, respectively.

In one example, device 120 may include a single antenna 107. In another example, device 120 may include two or more antennas 107.

In one example, device 150 may include a single antenna 157. In another example, device 140 may include two or more antennas 157.

Antennas 107 and/or 157 may include any type of antennas suitable for transmitting and/or receiving wireless communication signals, blocks, frames, transmission streams, packets, messages and/or data. For example, antennas 107 and/or 157 may include any suitable configuration, structure and/or arrangement of one or more antenna elements, components, units, assemblies and/or arrays. Antennas 107 and/or 157 may include, for example, antennas suitable for directional communication, e.g., using beamforming techniques. For example, antennas 107 and/or 157 may include a phased array antenna, a multiple element antenna, a set of switched beam antennas, and/or the like. In some embodiments, antennas 107 and/or 157 may implement transmit and receive functionalities using separate transmit and receive antenna elements. In some embodiments, antennas 107 and/or 157 may implement transmit and receive functionalities using common and/or integrated transmit/receive elements.

In some demonstrative embodiments, system 100 may include two or more wireless communication networks.

In some demonstrative embodiments, wireless communication devices 120, 130 and/or 140 may form, and/or may communicate as part of, a first wireless network 110.

In some demonstrative embodiments, wireless communication devices 150 and/or 160 may form, and/or may communicate as part of, a second wireless network 170.

In some demonstrative embodiments, wireless communication networks 110 and/or 170 may include a Wireless LAN (WLAN) network. In other embodiments, wireless communication networks 110 and/or 170 may include any other wireless network.

In some demonstrative embodiments, wireless networks 110 and 170 may be in proximity to each other.

In one example, wireless networks 110 and 170 may be located in the same indoor area, e.g., a building, a mall, an airport, a venue and/or the like.

In some demonstrative embodiments, wireless networks 110 and/or 170 may be utilized to determine an estimated location of a mobile device in the indoor area.

In one example, the estimated location of the mobile device may be determined by calculating two or more distances between the mobile device and two or more other stations, e.g., devices 120, 130, 140, 150 and/or 160, according to a location estimation method, e.g., a trilateration method.

The distance between the mobile device and the two or more other stations may be determined, for example, using a Time-of-Flight (ToF) measurement procedure. A ToF value may be defined as the overall time a signal propagates from a first station to a second station and back to the first station. The distance between the mobile device and a station may be calculated based on the ToF value between the mobile device and the station, for example, by dividing the ToF value by two and multiplying the result by the speed of light.

In some demonstrative embodiments, one or more devices of system 100 may belong to one or more coordinate domains.

In some demonstrative embodiments, a coordinate domain may include or may be defined, for example, by a coordinate grid and/or coordinate system.

In some demonstrative embodiments, a group of wireless devices may belong to a coordinate domain, for example, if the wireless devices of the group use the same coordinate grid and/or coordinate system.

In some demonstrative embodiments, a coordinate domain may be defined, for example, with respect to a point of origin.

In some demonstrative embodiments, a group of wireless devices may belong to a coordinate domain, for example, if the wireless devices of the group use the same point of origin, e.g., for example, to indicate a location of the wireless devices.

In some demonstrative embodiments, a group identifier may be configured to indicate that the wireless devices of the group belong to the same coordinate domain.

In some demonstrative embodiments, the group identifier may be configured to uniquely identify the group, e.g., the group identifier may include a unique group identifier.

In one example, the group identifier may be based on a media-access-control (MAC) address of a device of the group, and/or any other parameter.

In some demonstrative embodiments, wireless network 110 may have a first coordinate domain.

In some demonstrative embodiments, wireless network 170 may have a second coordinate domain.

In some demonstrative embodiments, the first coordinate domain may be different from the second coordinate domain.

In one example, the first coordinate domain may have a first point of origin, and the second coordinate domain may have a second point of origin, e.g., different from the first point of origin.

In another example, the first coordinate domain may have a first coordinate system, e.g., World Global System 84 (WGS84), and the second coordinate domain may have a second coordinate system, e.g., Europe Datum 50 (ED50).

In another example, the first coordinate domain may have any other attribute, which may be different from an attribute of the second coordinate domain.

In some demonstrative embodiments, a device of wireless communication network 110 may detect a device of another wireless communication network having another coordinate domain.

In some demonstrative embodiments, wireless communication device 120 may detect wireless communication device 150 of wireless network 170 having the second coordinate domain.

In one example, wireless communication device 120 may detect device 150 as part of an autonomous location determination procedure.

In some demonstrative embodiments, the autonomous location determination procedure may be configured to span a coordinate domain from a wireless communication device to one or more neighboring wireless communication devices, e.g., as described below.

Figure 2:
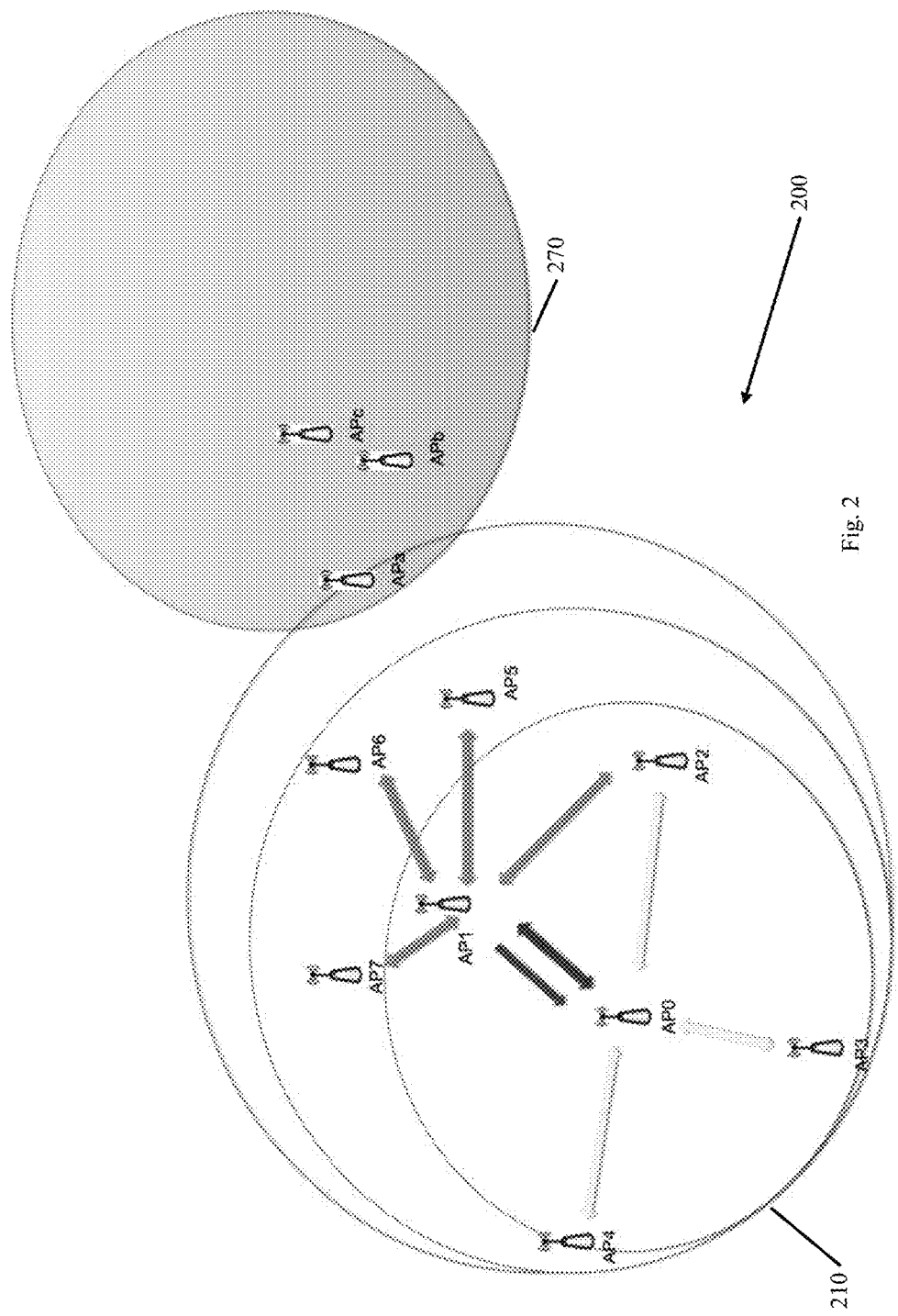
FIG. 2 is a schematic illustration of a plurality of Access Points detected during an autonomous location determination procedure, in accordance with some demonstrative embodiments.

Reference is made to FIG. 2, which schematically illustrates a plurality of Access Points detected during an autonomous location determination procedure 200, in accordance with some demonstrative embodiments.

As shown in FIG. 2, a wireless communication device, denoted AP0, may span a first local coordination domain from device AP0 to one or more other neighboring wireless communication devices, for example, six devices, denoted AP1-AP6.

As shown in FIG. 2, devices AP0-AP6 may be part of a first wireless communication network 210 having the first local coordination domain.

As shown in FIG. 2, device AP6 may detect another wireless communication device, denoted APa, for example, when the spanning of the first local coordination domain reaches APa. For example, device AP6 may perform the functionality of device 120 (FIG. 1) and/or device APa may perform the functionality of device 150 (FIG. 1).

AS shown in FIG. 2, device APa may be part of a second wireless communication network 270, with a device APb and/or a device APc.

In some demonstrative embodiments, second wireless communication network 270 may have a second local coordination domain, e.g., different from the first coordination domain.

In some demonstrative embodiments, the spanning of the first coordinate domain into the second coordinate domain may result in loss of coordinate grid values, corrupt coordinate grid values, and/or introducing or misrepresenting a local coordinate estimated error.

Referring back to FIG. 1, in some demonstrative embodiments, wireless communication device 120 may detect wireless communication device 150 as part of exchanging one or more Location Information Configuration (LCI) messages.

In some demonstrative embodiments, wireless communication device 120 may detect wireless communication device 150 as part of the autonomous location determination procedure, e.g., as described above.

In some demonstrative embodiments, wireless communication device 120 may detect wireless communication device 150 as part of any other communication protocol and/or location query protocol.

In some demonstrative embodiments, the deployment of devices belonging to two or more wireless networks (also referred to as "Conflicting Network Elements" (CNEs)) having different coordinate domains, e.g., wireless network 110 having the first coordinate domain and wireless network 170 having the second coordinate domain, in the same area may result in conflicts between the first coordinate domain and the second coordinate domain, and/or in loss and/or corruption of coordinate grid values.

Some demonstrative embodiments may provide a location protocol, which may enable conflict resolution and/or bridging between CNEs.

In some demonstrative embodiments, the location protocol may enable to bridge, and/or to solve conflicts between the first and second coordinate domains.

In some demonstrative embodiments, the location protocol may enable avoiding conflicts between different coordinate domains and/or wireless communication devices, which belong to different coordinate domains, e.g., as described below.

In some demonstrative embodiments, the location protocol may enable to synchronize the first and second coordinate domains between wireless communication networks 110 and 170, e.g., as described below.

In some demonstrative embodiments, the location protocol may include one or more phases, e.g., a conflict detection phase, an information exchanging phase, a comparison phase and/or a resolution stage, e.g., as described below.

In other embodiments, the location protocol may include any other phases, operations, method, stages, communications, and/or the like.

In some demonstrative embodiments, the conflict detection phase may include detection of the CNEs.

For example, device 120 may detect that wireless communication device 150 of wireless network 170 belongs to a different coordinate domain, for example, the second coordinate domain, e.g., as described above.

In some demonstrative embodiments, the information exchanging phase may include exchanging one or more messages between the CNEs, for example, to exchange information of the different coordinate domains between the CNEs, e.g., as described below.

For example, devices 120 and 150 may exchange one or messages to send and/or to receive information of the different coordinate domains.

In some demonstrative embodiments, the comparing phase may include comparing the coordinate information of the different coordinate domains.

For example, devices 120 and/or 150 may compare between the coordinate information of the first coordinate domain and the coordinate information of the second coordinate domain, e.g., as described below.

In some demonstrative embodiments, the resolution phase may include determining a resolution for the CNEs.

In one example, device 120 may determine whether or not to use the second coordinate domain of device 150, e.g., as described below.

In another example, device 150 may determine whether or not to use the first coordinate domain of device 120, e.g., as described below.

In some demonstrative embodiments, devices 120 and/or 150 may include a controller to control one or more phases, one or more operations and/or communications, for example, according to the location protocol, e.g., as described below.

In some demonstrative embodiments, device 120 may include a controller 122, and/or device 150 may include a controller 152.

In some demonstrative embodiments, controllers 122 and/or 152 may include circuitry, e.g., processor circuitry, memory circuitry, Media-Access Control (MAC) circuitry, Physical Layer (PHY) circuitry, and/or any other circuitry, configured to perform the functionality of controllers 122 and/or 152. Additionally or alternatively, one or more functionalities of controllers 122 and/or 152 may be implemented by logic, which may be executed by a machine and/or one or more processors, e.g., as described below.

In some demonstrative embodiments, device 120 may include a message processor 128 configured to generate, process and/or access one or messages communicated by device 120.

In one example, message processor 128 may be configured to generate one or more messages to be transmitted by device 120, and/or message processor 128 may be configured to access and/or to process one or more messages received by device 120, e.g., as described below.

In some demonstrative embodiments, device 150 may include a message processor 158 configured to generate, process and/or access one or messages communicated by device 150.

In one example, message processor 158 may be configured to generate one or more messages to be transmitted by device 150, and/or message processor 158 may be configured to access and/or to process one or more messages received by device 150, e.g., as described below.

In some demonstrative embodiments, message processors 128 and/or 158 may include circuitry, e.g., processor circuitry, memory circuitry, Media-Access Control (MAC) circuitry, Physical Layer (PHY) circuitry, and/or any other circuitry, configured to perform the functionality of message processors 128 and/or 158. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 154.

In some demonstrative embodiments, at least part of the functionality of message processor 128 may be implemented as part of controller 122, and/or at least part of the functionality of message processor 158 may be implemented as part of controller 154.

In other embodiments, the functionality of message processor 128 may be implemented as part of any other element of device 120, and/or the functionality of message processor 158 may be implemented as part of any other element of device 104.

In some demonstrative embodiments, radio 114 may receive a message 109 from wireless communication device 150.

In some demonstrative embodiments, message 109 may include the coordinate information of the second coordinate domain of wireless communication network 170.

In some demonstrative embodiments, message 109 may include a location information configuration request or a location information configuration response.

In some demonstrative embodiments, message 109 may include the location information configuration response, for example, if device 120 requests message 109 from device 150, e.g., as described below.

In some demonstrative embodiments, the location information configuration response may be, for example, in response to a location information configuration request from device 120.

In some demonstrative embodiments, radio 114 may transmit the location information configuration request to device 150, e.g., to request the coordinate information from device 150.

In one example, controller 122 may request the coordinate information from device 150, for example, upon detection of device 150 by device 120.

In some demonstrative embodiments, message 109 may include the location information configuration request, for example, if device 120 receives the coordinate information from device 150, e.g., without requesting the coordinate information from device 150.

For example, radio 154 may transmit to device 120 the coordinate information in the location information configuration request, e.g., upon the detection of device 150 by device 120.

In other embodiments, message 109 may include any other message communicated from device 150 to device 120.

In some demonstrative embodiments, the coordinate information in message 109 may include one or more parameters of the second coordinate domain, for example, a coordinate system type of the second coordinate domain, a point of origin of the second coordinate domain, a group identifier of the second communication network, a maximal distance from a point of origin of the second coordinate domain, one or more privacy policies of the second communication network, one or more accuracy requirements of the second coordinate domain, and/or any other parameter of the second coordinate domain.

For example, the coordinate information in message 109 may include a group identifier corresponding to the second coordinate domain. For example, the group identifier may be configured to uniquely identify the second coordinate domain. In one example, the group identifier may be based on a MAC address of a device of the second communication network.

In some demonstrative embodiments, controller 122 may receive message 109 and may process message 109.

In some demonstrative embodiments, controller 122 may determine a resolution for the CNEs, for example, a resolution of the conflict between the first coordinate domain of wireless communication network 110 and the second coordinate domain of wireless communication network 170, e.g., as described below.

In some demonstrative embodiments, controller 122 may determine a usage of the second coordinate domain by device 120 based on the coordinate information of the of the second coordinate domain, which is included in message 109.

In some demonstrative embodiments, controller 122 may publish the usage of the second coordinate domain to device 150.

In some demonstrative embodiments, controller 122 may publish the usage of the second coordinate domain to another wireless communication devices of wireless communication network 110.

In one example, controller 122 may publish the usage of the second coordinate domain to devices 130 and 140 of wireless communication network 110, e.g., to notify devices 130 and 140 on the usage of the second coordinate domain.

In some demonstrative embodiments, controller 122 may determine the usage of the second coordinate domain, for example, by selecting between using the second coordinate domain (also referred to as "merge coordinate domains"), not using the second coordinate domain (also referred to as "separate coordinate domains"), and bridging between the first and second coordinate domain (also referred to as "bridge domains"), e.g., as described in detail below.

In some demonstrative embodiments, the "merge coordinate domain" solution may include device 120 using the same coordinate domain of device 150, while making the first coordinate domain of device 120 obsolete.

In some demonstrative embodiments, controller 122 may determine device 120 may use the second coordinate domain of wireless communication network 170, for example, instead of the first coordinate domain of wireless communication network 110.

In one example, device 120 may use the second coordinate domain, and devices 130 and 140 may use the second coordinate domain, e.g., after device 120 publishes the usage of the second coordinate domain to devices 130 and 140. According to this example, the first coordinate domain may become obsolete.

In some demonstrative embodiments, devices 120, 130 and 140 may continue to use the first coordinate domain, e.g., together with the second coordinate domain, for example, until all devices of wireless network 110 are notified on the usage of the second coordinate domain, and/or until all devices of wireless network 110 switch to using the second coordinate domain.

In some demonstrative embodiments, the "separate coordinate domain" solution may include determining that the second coordinate domain is not suitable for use by devices of wireless communication network 110. For example, controller 122 may mark the second coordinate domain as "do not-use", by devices of wireless communication network 110.

In some demonstrative embodiments, controller 122 may determine that device 120 may not use the second coordinate domain. For example, controller 122 may determine that device 120 may continue to use the first coordinate domain.

In one example, controller 122 may determine that device 120 may not use the second coordinate domain, for example, if the second coordinate domain is not suitable to be used by devices 120, 130 and/or 140.

For example, the second coordinate domain may not be suitable to be used by devices 120, 130 and/or 140, e.g., if the accuracy requirements of the second coordinate domain are less than the accuracy requirements of the first coordinate domain, and/or the privacy policies of the second communication network are less than privacy policies of the first communication network.

In some demonstrative embodiments, the "bridge domain" solution may include devices of wireless communication network 110 continuing to use the first coordinate domain, and devices of wireless communication network 170 continuing to use the second coordinate domain. However, devices of both wireless communication networks 110 and 170 may be able to conduct location transactions and/or measurements between both of the devices, e.g., as described below.

In some demonstrative embodiments, controller 122 may select the "bridge domain" solution, for example, to enable devices of wireless communication network 110 to conduct the location transactions and measurements with the devices of wireless communication network 170.

In one example, devices of both wireless communication networks 110 and 170 may be able to conduct the location transactions and/or the measurements between both of the devices, for example, by assigning a link (also referred to as "conflicting network element bridge") between devices 120 and 150 and/or between devices AP6 and APa, e.g., as described below.

In some demonstrative embodiments, controller 122 may bridge between the first and second coordinate domains, for example, based on a coordinate transformation to transform coordinate values of the second coordinate domain into coordinate values of the first coordinate domain.

According to these embodiments, devices 120, 130 and/or 140 may use the first coordinate domain, and/or devices 150 and 160 may use the second coordinate domain. However, devices 120, 130 and 140 may be able to use coordinate values of the second coordinate domain.

In some demonstrative embodiments, device 150 may be configured to determine a usage of the first coordinate domain, for example, independently from device 120.

In some demonstrative embodiments, controller 152 may be configured to determine the usage of the first coordinate domain, for example, based on coordinate information of the first coordinate domain.

In some demonstrative embodiments, controller 152 may publish the usage of the second coordinate domain to device 120.

In some demonstrative embodiments, controller 152 may publish the usage of the second coordinate domain to other wireless communication devices of wireless communication network 170.

In some demonstrative embodiments, controller 152 may determine the usage of the second coordinate domain, for example, by selecting between using the first coordinate domain, not using the first coordinate domain, and bridging between the first and second coordinate domains, e.g., as described in detail below.

In some demonstrative embodiments, controller 152 may determine device 120 may use the first coordinate domain of wireless communication network 110, for example, instead of the second coordinate domain of wireless communication network 110.

For example, controller 152 may determine device 120 may use the first coordinate domain, e.g., if controller 152 selects the "merge coordinate domain" solution.

According to these embodiments, devices 120 and 150 may use the first coordinate domain, e.g., the second coordinate domain may become obsolete.

In some demonstrative embodiments, controller 152 may determine that device 150 may not use the second coordinate domain, for example, device 150 may continue to use the first coordinate domain.

For example, controller 152 may determine device 120 may not use the first coordinate domain, e.g., if controller 152 selects the "separate coordinate domain" solution.

In some demonstrative embodiments, controller 152 may bridge between the first and second coordinate domains, for example, based on a coordinate transformation to transform coordinate values of the first coordinate domain into coordinate values of the second coordinate domain.

For example, controller 152 may determine device 120 may bridge between the first and second coordinate domains, e.g., if controller 152 selects the "bridge domain" solution.

In some demonstrative embodiments, controller 122 may determine the usage of the second coordinate domain, for example, based on a comparison between the coordinate information of the second coordinate domain and coordinate information of the first coordinate domain.

In some demonstrative embodiments, controller 122 may determine the usage of the second coordinate domain, for example, based on a comparison between accuracy requirements of the first and second coordinate domains.

For example, the coordinate information of the first coordinate domain may include first accuracy requirements of the first coordinate domain, and the coordinate information of the second coordinate domain may include second accuracy requirements of the second coordinate domain. According to this example, controller 122 may determine to use the second coordinate domain, for example, if the second accuracy requirements are higher than the first accuracy requirement.

In some demonstrative embodiments, controller 122 may determine the usage of the second coordinate domain, for example, based on a comparison between maximal distance from the point of origin of the first and second coordinate domains.

For example, the coordinate information of the first coordinate domain may include a first maximal distance from the point of origin of the first coordinate domain, and the coordinate information of the second coordinate domain may include a second maximal distance from the point of origin of the second coordinate domain. According to this example, controller 122 may determine not to use the second coordinate domain, for example, if the first maximal distance from the point of origin of the first coordinate domain is greater than the second maximal distance from the point of origin of the second coordinate domain.

In some demonstrative embodiments, controller 122 may determine the usage of the second coordinate domain, for example, based on a comparison between a type of system of the first and second coordinate domains.

For example, the coordinate information of the first coordinate domain may include a first coordinate system type, e.g., WGS84, and the coordinate information of the second coordinate domain may include a second coordinate system type, e.g., ED50. According to this example, controller 122 may determine to bridge between the first and second coordinate domains, for example, to enable devices 120, 130 and/or 140 to use coordinate values according to the ED50 coordinate system, e.g., coordinate values from devices 150 and/or 160.

In some demonstrative embodiments, controller 122 may determine the usage of the second coordinate domain, for example, based on a comparison between any other parameter of the first and second coordinate domains.

In some demonstrative embodiments, using the location protocol may enable controllers 122 and/or 152 to synchronize between two communication networks having different coordinate domains, which are located in the same area or in proximity to each other.

In some demonstrative embodiments, the synchronization between the first and second coordinate domains may facilitate a location estimation of a mobile device, based on the first and second coordinate domains.

Figure 3:
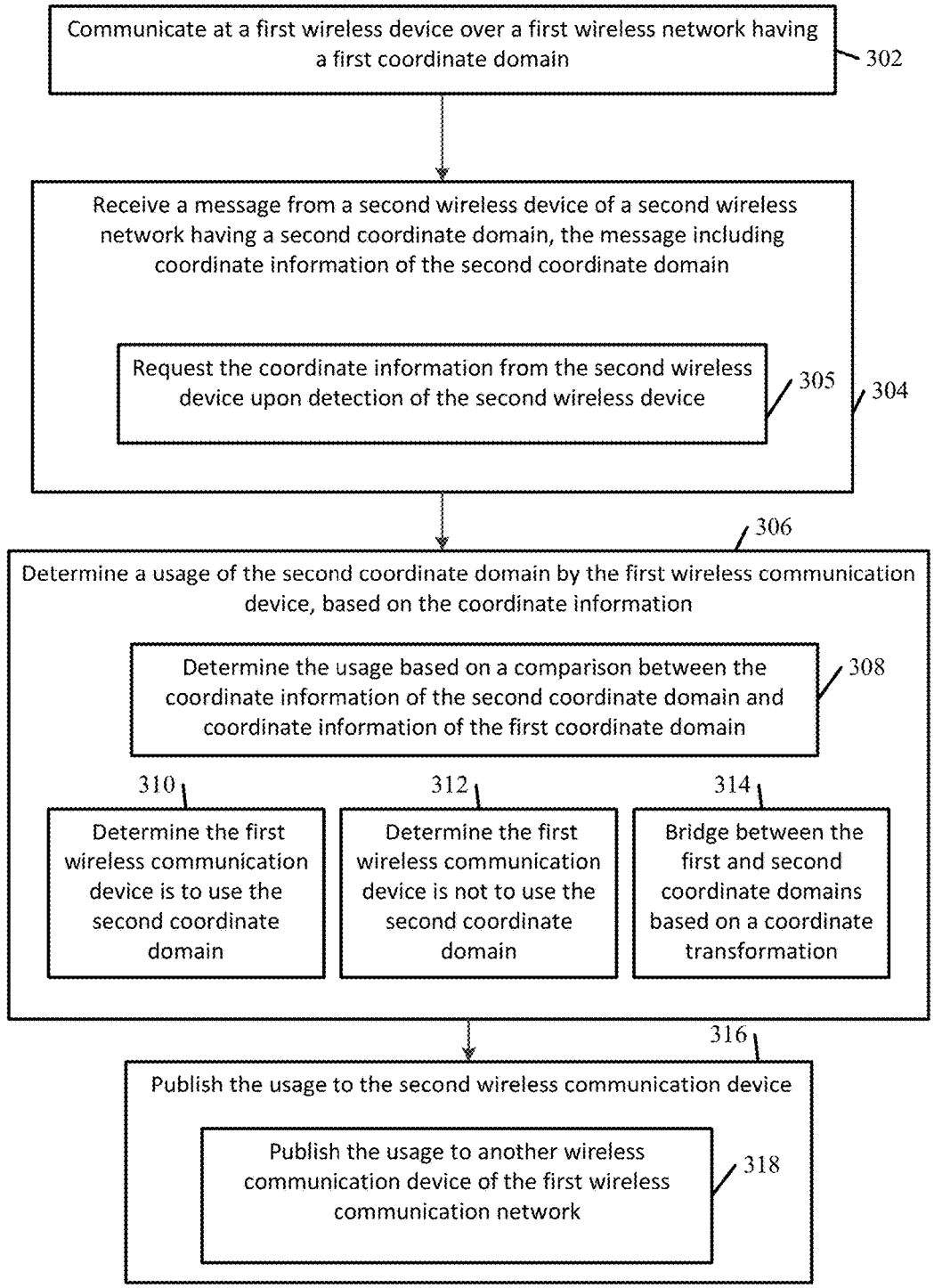
FIG. 3 is a schematic flow-chart illustration of a method of communication between wireless networks having different coordinate domains, in accordance with some demonstrative embodiments.

Reference is made to FIG. 3, which schematically illustrates a method of communication between a first wireless network having a first coordinate domain and a second wireless network having a second coordinate domain. One or more operations of the method of FIG. 3 may be performed, for example, by one or more elements of a system, e.g., system 100 (FIG. 1); a device, e.g., device 120 (FIG. 1) and/or device 150 (FIG. 1); a controller, e.g., controller 122 (FIG. 1), and/or controller 152 (FIG. 1); a radio, e.g., radio 114 (FIG. 1), and/or radio 154 (FIG. 1); and/or a message processor, e.g., message processor 128 (FIG. 1), and/or message processor 158 (FIG. 1).

As indicated at block 302, the method may include communicating at a first wireless device over a first wireless network having a first coordinate domain. For example, radio 114 (FIG. 1) may communicate over first wireless network 170 (FIG. 1) having the first coordinate domain, e.g., as described above.

As indicated at block 304, the method may include receiving a message from a second wireless device of a second wireless network having a second coordinate domain, the message including coordinate information of the second coordinate domain. For example, radio 114 (FIG. 1) may receive from device 150 (FIG. 1) message 109 (FIG. 1) including the coordinate information of the second coordinate domain, e.g., as described above.

As indicated at block 305, receiving the message from the second wireless device may include requesting the coordinate information from the second wireless device, e.g., upon detection of the second wireless device. For example, radio 114 (FIG. 1) may request the coordinate information from device 150 (FIG. 1), for example, upon detection of device 150 (FIG. 1), e.g., as described above.

As indicated at block 306, the method may include determining, based on the coordinate information of the second coordinate domain, a usage of the second coordinate domain by the first wireless communication device. For example, controller 122 (FIG. 1) may determine the usage of the second coordinate domain by the wireless communication device 120 (FIG. 1), e.g., as described above.

As indicated at block 308, determining the usage of the second coordinate domain may include determining the usage of the second coordinate domain based on a comparison between the coordinate information of the second coordinate domain and coordinate information of the first coordinate domain. For example, controller 122 (FIG. 1) may determine the usage based on a comparison between the coordinate information of the second coordinate domain and the coordinate information of the first coordinate domain, e.g., as described above.

As indicated at block 310, determining the usage of the second coordinate domain may include determining that the first wireless communication device is to use the second coordinate domain, instead of the first coordinate domain. For example, controller 122 (FIG. 1) may determine device 120 (FIG. 1) is to use the second coordinate domain, e.g., as described above.

As indicated at block 312, determining the usage of the second coordinate domain may include determining that the first wireless communication device is not to use the second coordinate domain, and to use the first coordinate domain. For example, controller 122 (FIG. 1) may determine device 120 (FIG. 1) is not to use the second coordinate domain, e.g., as described above.

As indicated at block 314, determining the usage of the second coordinate domain may include bridging between the first and second coordinate domains based on a coordinate transformation to transform coordinate values of the second coordinate domain into coordinate values of the first coordinate domain. For example, controller 122 (FIG. 1) may bridge between the first and second coordinate domains based on the coordinate transformation, e.g., as described above.

As indicated at block 316, the method may include publishing the usage of the second coordinate domain to the second wireless communication device. For example, controller 122 (FIG. 1) may publish the usage of the second coordinate domain to wireless communication device 150 (FIG. 1), e.g., as described above.

As indicated at block 318, publishing the usage may include publishing the usage of the second coordinate domain to another wireless communication device of the first wireless communication network. For example, controller 122 (FIG. 1) may publish the usage of the second coordinate domain to wireless communication devices 130 and/or 140 (FIG. 1), e.g., as described above.

Figure 4:
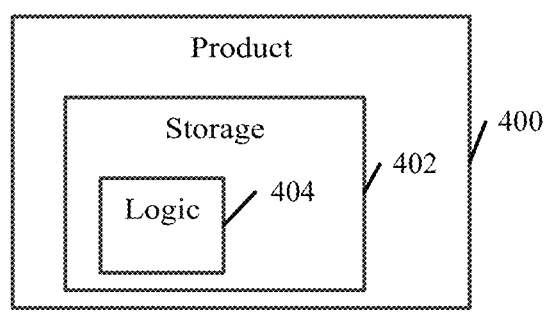
FIG. 4 is a schematic illustration of a product, in accordance with some demonstrative embodiments.

Reference is made to FIG. 4, which schematically illustrates a product of manufacture 400, in accordance with some demonstrative embodiments. Product 400 may include a non-transitory machine-readable storage medium 402 to store logic 404, which may be used, for example, to perform at least part of the functionality of devices 120 (FIG. 1), 130 (FIG. 1), 140 (FIG. 1), 150 (FIG. 1), and/or 160 (FIG. 1); radios 114 and/or 154 (FIG. 1); transmitter 118 (FIG. 1); receiver 116 (FIG. 1); controllers 122 and/or 152 (FIG. 1); message processors 128 and/or 158 (FIG. 1); and/or to perform one or more of the operations of the method of FIG. 3. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a first wireless communication device comprising a radio to communicate over a first wireless network having a first coordinate domain, the radio to receive a message from a second wireless device of a second wireless network having a second coordinate domain, the message including coordinate information of the second coordinate domain; and a controller to determine, based on the coordinate information, a usage of the second coordinate domain by the first wireless communication device, and to publish the usage to the second wireless communication device.

Example 2 includes the subject matter of Example 1, and optionally, wherein the controller is to determine the first wireless communication device is to use the second coordinate domain, instead of the first coordinate domain.

Example 3 includes the subject matter of Example 1, and optionally, wherein the controller is to determine the first wireless communication device is not to use the second coordinate domain, and to use the first coordinate domain.

Example 4 includes the subject matter of Example 1, and optionally, wherein the controller is to bridge between the first and second coordinate domains based on a coordinate transformation to transform coordinate values of the second coordinate domain into coordinate values of the first coordinate domain.

Example 5 includes the subject matter of any one of Examples 1-4, and optionally, wherein the controller is to request the coordinate information from the second wireless device upon detection of the second wireless device.

Example 6 includes the subject matter of any one of Examples 1-5, and optionally, wherein the coordinate information comprises one or more parameters selected from the group consisting of a coordinate system type, a point of origin of the second coordinate domain, a group identifier of the second communication network, a maximal distance from a point of origin, one or more privacy policies of the second communication network, and one or more accuracy requirements of the second coordinate domain.

Example 7 includes the subject matter of any one of Examples 1-6, and optionally, wherein the controller is to determine the usage based on a comparison between the coordinate information of the second coordinate domain and coordinate information of the first coordinate domain.

Example 8 includes the subject matter of any one of Examples 1-7, and optionally, wherein the controller is to publish the usage to another wireless communication device of the first wireless communication network.

Example 9 includes the subject matter of any one of Examples 1-8, and optionally, wherein the message comprises a location information configuration request, or a location information configuration response.

Example 10 includes the subject matter of any one of Examples 1-9, and optionally, wherein the first and second wireless communication networks are in proximity to each other.

Example 11 includes the subject matter of any one of Examples 1-10, and optionally comprising an Access Point (AP) or a station (STA).

Example 12 includes a system including a first wireless communication device, the first wireless communication device comprising one or more antennas; a radio to communicate over a first wireless network having a first coordinate domain, the radio to receive a message from a second wireless device of a second wireless network having a second coordinate domain, the message including coordinate information of the second coordinate domain; and a controller to determine, based on the coordinate information, a usage of the second coordinate domain by the first wireless communication device, and to publish the usage to the second wireless communication device.

Example 13 includes the subject matter of Example 12, and optionally, wherein the controller is to determine the first wireless communication device is to use the second coordinate domain, instead of the first coordinate domain.

Example 14 includes the subject matter of Example 12, and optionally, wherein the controller is to determine the first wireless communication device is not to use the second coordinate domain, and to use the first coordinate domain.

Example 15 includes the subject matter of Example 12, and optionally, wherein the controller is to bridge between the first and second coordinate domains based on a coordinate transformation to transform coordinate values of the second coordinate domain into coordinate values of the first coordinate domain.

Example 16 includes the subject matter of any one of Examples 12-15, and optionally, wherein the controller is to request the coordinate information from the second wireless device upon detection of the second wireless device.

Example 17 includes the subject matter of any one of Examples 12-16, and optionally, wherein the coordinate information comprises one or more parameters selected from the group consisting of a coordinate system type, a point of origin of the second coordinate domain, a group identifier of the second communication network, a maximal distance from a point of origin, one or more privacy policies of the second communication network, and one or more accuracy requirements of the second coordinate domain.

Example 18 includes the subject matter of any one of Examples 12-17, and optionally, wherein the controller is to determine the usage based on a comparison between the coordinate information of the second coordinate domain and coordinate information of the first coordinate domain.

Example 19 includes the subject matter of any one of Examples 12-18, and optionally, wherein the controller is to publish the usage to another wireless communication device of the first wireless communication network.

Example 20 includes the subject matter of any one of Examples 12-19, and optionally, wherein the message comprises a location information configuration request, or a location information configuration response.

Example 21 includes the subject matter of any one of Examples 12-20, and optionally, wherein the first and second wireless communication networks are in proximity to each other.

Example 22 includes the subject matter of any one of Examples 12-21, and optionally, wherein the first wireless communication device is an Access Point (AP) or a station (STA).

Example 23 includes a method to be performed at a first wireless communication device, the method comprising communicating over a first wireless network having a first coordinate domain; receiving a message from a second wireless device of a second wireless network having a second coordinate domain, the message including coordinate information of the second coordinate domain; determining, based on the coordinate information, a usage of the second coordinate domain by the first wireless communication device; and publishing the usage to the second wireless communication device.

Example 24 includes the subject matter of Example 23, and optionally comprising determining the first wireless communication device is to use the second coordinate domain, instead of the first coordinate domain.

Example 25 includes the subject matter of Example 23, and optionally comprising determining the first wireless communication device is not to use the second coordinate domain, and to use the first coordinate domain.

Example 26 includes the subject matter of Example 23, and optionally comprising bridging between the first and second coordinate domains based on a coordinate transformation to transform coordinate values of the second coordinate domain into coordinate values of the first coordinate domain.

Example 27 includes the subject matter of any one of Examples 23-26, and optionally comprising requesting the coordinate information from the second wireless device upon detection of the second wireless device.

Example 28 includes the subject matter of any one of Examples 23-27, and optionally, wherein the coordinate information comprises one or more parameters selected from the group consisting of a coordinate system type, a point of origin of the second coordinate domain, a group identifier of the second communication network, a maximal distance from a point of origin, one or more privacy policies of the second communication network, and one or more accuracy requirements of the second coordinate domain.

Example 29 includes the subject matter of any one of Examples 23-28, and optionally comprising determining the usage based on a comparison between the coordinate information of the second coordinate domain and coordinate information of the first coordinate domain.

Example 30 includes the subject matter of any one of Examples 23-29, and optionally comprising publishing the usage to another wireless communication device of the first wireless communication network.

Example 31 includes the subject matter of any one of Examples 23-30, and optionally, wherein the message comprises a location information configuration request, or a location information configuration response.

Example 32 includes the subject matter of any one of Examples 23-31, and optionally, wherein the first and second wireless communication networks are in proximity to each other.

Example 33 includes a product including one or more tangible computer-readable non-transitory storage media comprising computer-executable instructions operable to, when executed by at least one computer processor, enable the at least one computer processor to implement a method at a first wireless communication device, the method comprising communicating over a first wireless network having a first coordinate domain; receiving a message from a second wireless device of a second wireless network having a second coordinate domain, the message including coordinate information of the second coordinate domain; determining, based on the coordinate information, a usage of the second coordinate domain by the first wireless communication device; and publishing the usage to the second wireless communication device.

Example 34 includes the subject matter of Example 33, and optionally, wherein the method comprises determining the first wireless communication device is to use the second coordinate domain, instead of the first coordinate domain.

Example 35 includes the subject matter of Example 33, and optionally, wherein the method comprises determining the first wireless communication device is not to use the second coordinate domain, and to use the first coordinate domain.

Example 36 includes the subject matter of Example 33, and optionally, wherein the method comprises bridging between the first and second coordinate domains based on a coordinate transformation to transform coordinate values of the second coordinate domain into coordinate values of the first coordinate domain.

Example 37 includes the subject matter of any one of Examples 33-36, and optionally, wherein the method comprises requesting the coordinate information from the second wireless device upon detection of the second wireless device.

Example 38 includes the subject matter of any one of Examples 33-37, and optionally, wherein the coordinate information comprises one or more parameters selected from the group consisting of a coordinate system type, a point of origin of the second coordinate domain, a group identifier of the second communication network, a maximal distance from a point of origin, one or more privacy policies of the second communication network, and one or more accuracy requirements of the second coordinate domain.

Example 39 includes the subject matter of any one of Examples 33-38, and optionally, wherein the method comprises determining the usage based on a comparison between the coordinate information of the second coordinate domain and coordinate information of the first coordinate domain.

Example 40 includes the subject matter of any one of Examples 33-39, and optionally, wherein the method comprises publishing the usage to another wireless communication device of the first wireless communication network.

Example 41 includes the subject matter of any one of Examples 33-40, and optionally, wherein the message comprises a location information configuration request, or a location information configuration response.

Example 42 includes the subject matter of any one of Examples 33-41, and optionally, wherein the first and second wireless communication networks are in proximity to each other.

Example 43 includes an apparatus of wireless communication, the apparatus comprising means for communicating at a first wireless communication device over a first wireless network having a first coordinate domain; means for receiving a message from a second wireless device of a second wireless network having a second coordinate domain, the message including coordinate information of the second coordinate domain; means for determining, based on the coordinate information, a usage of the second coordinate domain by the first wireless communication device; and means for publishing the usage to the second wireless communication device.

Example 44 includes the subject matter of Example 43, and optionally comprising means for determining the first wireless communication device is to use the second coordinate domain, instead of the first coordinate domain.

Example 45 includes the subject matter of Example 43, and optionally comprising means for determining the first wireless communication device is not to use the second coordinate domain, and to use the first coordinate domain.

Example 46 includes the subject matter of Example 43, and optionally comprising means for bridging between the first and second coordinate domains based on a coordinate transformation to transform coordinate values of the second coordinate domain into coordinate values of the first coordinate domain.

Example 47 includes the subject matter of any one of Examples 43-46, and optionally comprising means for requesting the coordinate information from the second wireless device upon detection of the second wireless device.

Example 48 includes the subject matter of any one of Examples 43-47, and optionally, wherein the coordinate information comprises one or more parameters selected from the group consisting of a coordinate system type, a point of origin of the second coordinate domain, a group identifier of the second communication network, a maximal distance from a point of origin, one or more privacy policies of the second communication network, and one or more accuracy requirements of the second coordinate domain.

Example 49 includes the subject matter of any one of Examples 43-48, and optionally comprising means for determining the usage based on a comparison between the coordinate information of the second coordinate domain and coordinate information of the first coordinate domain.

Example 50 includes the subject matter of any one of Examples 43-49, and optionally comprising means for publishing the usage to another wireless communication device of the first wireless communication network.

Example 51 includes the subject matter of any one of Examples 43-50, and optionally, wherein the message comprises a location information configuration request, or a location information configuration response.

Example 52 includes the subject matter of any one of Examples 43-51, and optionally, wherein the first and second wireless communication networks are in proximity to each other.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A first wireless communication device comprising:
 a radio to communicate over a first wireless network having a first coordinate domain, the radio to receive a message from a second wireless communication device of a second wireless network having a second coordinate domain, the message including coordinate information of said second coordinate domain; and
 a controller to determine, based on said coordinate information, a usage of said second coordinate domain by said first wireless communication device, and to publish said usage to said second wireless communication device.

2. The first wireless communication device of claim 1, wherein said controller is to determine said first wireless communication device is to use said second coordinate domain, instead of said first coordinate domain.

3. The first wireless communication device of claim 1, wherein said controller is to determine said first wireless communication device is not to use said second coordinate domain, and to use said first coordinate domain.

4. The first wireless communication device of claim 1, wherein said controller is to bridge between said first and second coordinate domains based on a coordinate transformation to transform coordinate values of said second coordinate domain into coordinate values of said first coordinate domain.

5. The first wireless communication device of claim 1, wherein said controller is to request said coordinate information from said second wireless communication device upon detection of said second wireless communication device.

6. The first wireless communication device of claim 1, wherein said coordinate information comprises one or more parameters selected from the group consisting of a coordinate system type, a point of origin of said second coordinate domain, a group identifier of said second wireless network, a maximal distance from a point of origin, one or more privacy policies of said second wireless network, and one or more accuracy requirements of said second coordinate domain.

7. The first wireless communication device of claim 1, wherein said controller is to determine said usage based on a comparison between said coordinate information of said second coordinate domain and coordinate information of said first coordinate domain.

8. The first wireless communication device of claim 1, wherein said controller is to publish said usage to another wireless communication device of said first wireless network.

9. The first wireless communication device of claim 1, wherein said message comprises a location information configuration request, or a location information configuration response.

10. The first wireless communication device of claim 1, wherein said first and second wireless networks are in proximity to each other.

11. The first wireless communication device of claim 1 comprising an Access Point (AP) or a station (STA).

12. A system including a first wireless communication device, the first wireless communication device comprising:
 one or more antennas;
 a radio to communicate over a first wireless network having a first coordinate domain, the radio to receive a message from a second wireless communication device of a second wireless network having a second coordinate domain, the message including coordinate information of said second coordinate domain; and
 a controller to determine, based on said coordinate information, a usage of said second coordinate domain by said first wireless communication device, and to publish said usage to said second wireless communication device.

13. The system of claim 12, wherein said controller is to determine said first wireless communication device is to use said second coordinate domain, instead of said first coordinate domain.

14. The system of claim 12, wherein said controller is to determine said first wireless communication device is not to use said second coordinate domain, and to use said first coordinate domain.

15. The system of claim 12, wherein said controller is to bridge between said first and second coordinate domains based on a coordinate transformation to transform coordinate values of said second coordinate domain into coordinate values of said first coordinate domain.

16. The system of claim 12, wherein said controller is to request said coordinate information from said second wireless communication device upon detection of said second wireless communication device.

17. A method to be performed at a first wireless communication device, the method comprising:
communicating over a first wireless network having a first coordinate domain;
receiving a message from a second wireless communication device of a second wireless network having a second coordinate domain, the message including coordinate information of said second coordinate domain;
determining, based on said coordinate information, a usage of said second coordinate domain by said first wireless communication device; and
publishing said usage to said second wireless communication device.

18. The method of claim 17 comprising determining said first wireless communication device is to use said second coordinate domain, instead of said first coordinate domain.

19. The method of claim 17 comprising determining said first wireless communication device is not to use said second coordinate domain, and to use said first coordinate domain.

20. The method of claim 17 comprising bridging between said first and second coordinate domains based on a coordinate transformation to transform coordinate values of said second coordinate domain into coordinate values of said first coordinate domain.

21. A product including one or more tangible computer-readable non-transitory storage media comprising computer-executable instructions operable to, when executed by at least one computer processor, enable the at least one computer processor to cause a first wireless communication device to:
communicate over a first wireless network having a first coordinate domain;
receive a message from a second wireless communication device of a second wireless network having a second coordinate domain, the message including coordinate information of said second coordinate domain;
determine, based on said coordinate information, a usage of said second coordinate domain by said first wireless communication device; and
publish said usage to said second wireless communication device.

22. The product of claim 21, wherein said instructions, when executed, cause said first wireless communication device to determine said first wireless communication device is to use said second coordinate domain, instead of said first coordinate domain.

23. The product of claim 21, wherein said instructions, when executed, cause said first wireless communication device to determine said first wireless communication device is not to use said second coordinate domain, and to use said first coordinate domain.

24. The product of claim 21, wherein said instructions, when executed, cause said first wireless communication device to bridge between said first and second coordinate domains based on a coordinate transformation to transform coordinate values of said second coordinate domain into coordinate values of said first coordinate domain.

25. The product of claim 21, wherein said instructions, when executed, cause said first wireless communication device to request said coordinate information from said second wireless communication device upon detection of said second wireless communication device.

* * * * *